United States Patent [19]
Watts

[11] Patent Number: 5,431,960
[45] Date of Patent: Jul. 11, 1995

[54] ANTI-SLIP FLOOR COATING COMPOSITION

[76] Inventor: Charles E. Watts, 6404 Ebenezer Church Rd., Raleigh, N.C. 27612

[21] Appl. No.: 297,159

[22] Filed: Aug. 29, 1994

[51] Int. Cl.$^6$ ............................................... B05D 3/12
[52] U.S. Cl. ................................... 427/359; 427/428; 524/186; 524/458; 524/914
[58] Field of Search .................. 427/359, 369, 428; 524/186, 458, 914

[56] References Cited

U.S. PATENT DOCUMENTS

| | | | |
|---|---|---|---|
| 4,151,138 | 4/1979 | Citrone et al. | 427/221 X |
| 5,349,003 | 9/1994 | Kato et al. | 524/545 X |

Primary Examiner—Michael Lusignan
Attorney, Agent, or Firm—Rhodes, Coats & Bennett

[57] ABSTRACT

A water-based acrylic-type floor coating composition is applied to a floor surface for providing slip resistance. The transparent floor coating when applied includes a base layer with particles distributed and anchored uniformly throughout the base layer. The particles have a relatively large size and range in size from $5 \times 10^{-4}$ to $2.34 \times 10^{-2}$ inches. The particles are sized with respect to their thickness ratio with the base layer such that the particle size to base layer thickness ratio is in the range of between 10.1 to 1.0 and 1.01 to 1.0. The size of the particles results in a top portion of the particles protruding above the surface of the base layer to provide traction.

31 Claims, 1 Drawing Sheet

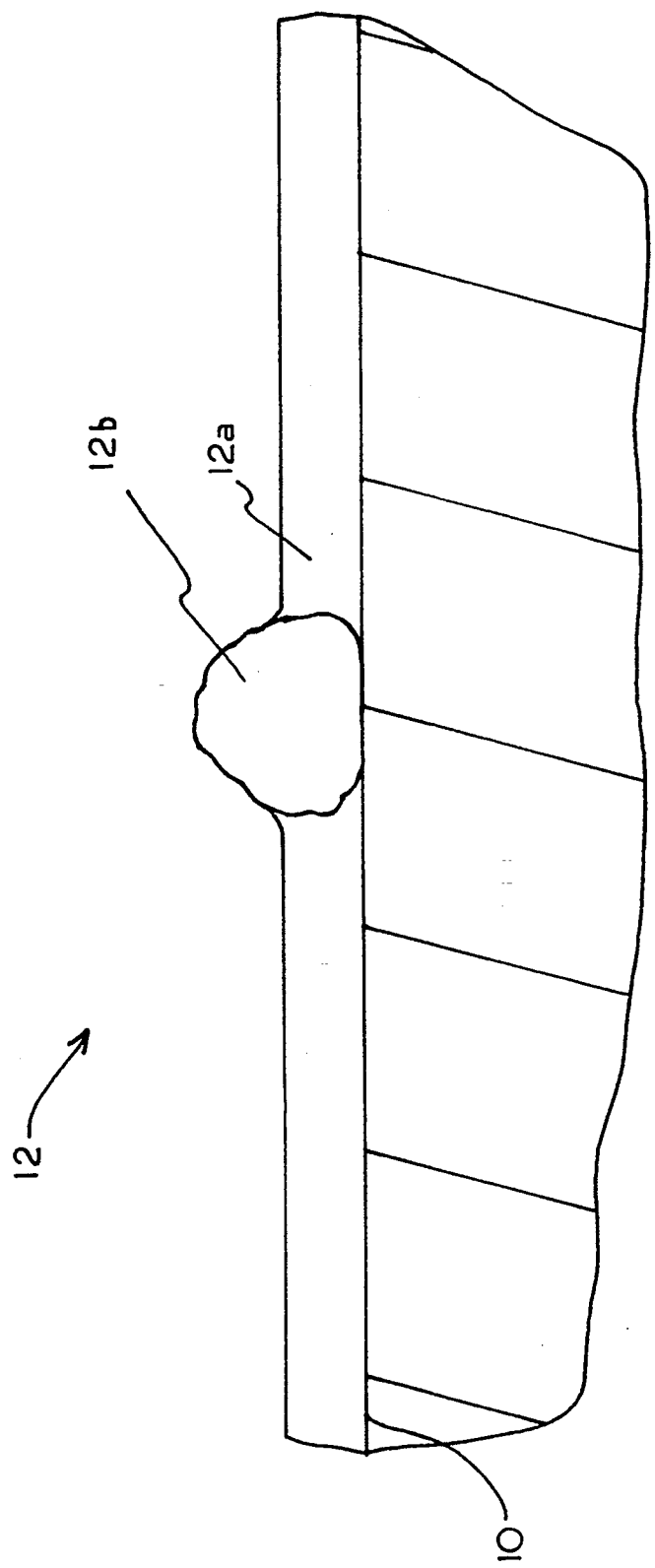

ANTI-SLIP FLOOR COATING COMPOSITION

FIELD OF INVENTION

The present invention relates generally to floor coatings, and more particularly to anti-slip floor coatings.

BACKGROUND OF THE INVENTION

Slip and fall accidents caused by slippery, smooth floor surfaces are very prevalent and often result in serious injury. The inherent slipperiness of a smooth floor surface is often aggravated by the wide spread use of various transparent, shiny coatings which are applied to protect the surfaces and to make them more aesthetically pleasing. In addition, smooth floor surfaces become particularly slippery and treacherous when they become wet or otherwise contaminated with liquids, food, debris, etc.

An excellent example of the problem of slippery floor surfaces can be found in the supermarket industry. The floors in supermarkets are conventionally composed of vinyl composition tiles coated with transparent, shiny acrylic floor coatings to provide a good cleanliness impression to customers. According to Food Marketing Institute statistics, customer slips and falls accounted for 52.3% of customer accidents during the period of 1985 to 1989.

Another example of the problem of slippery floors can be found in the work areas of supermarkets and allied distribution and processing facilities. Typically, these work areas have floors made of smooth-finished concrete which may be coated with slippery, non-aqueous solvent based urethane or epoxy sealers. Statistics for the time period of 1985 to 1989 show that slips and falls were also very numerous in these areas and accounted for approximately 11 to 16% of employee injuries. More specifically, the percentages of total injuries in these work areas due to slips and falls were as follows:

| | |
|---|---|
| stores | 11.9% |
| distribution centers | 11.4% |
| bakeries | 16.1% |
| meat processing | 13.7% |

Despite the clear problem of slippery floor surfaces, the prior art has failed to address and solve the problem of providing an effective anti-slip coating to a floor while still maintaining a transparent, shiny and "wet-look" floor appearance. The need for an effective anti-slip floor coating solution that will not alter the bright and shiny look of a grocery store or other retail floor, for example, cannot be overstated. In order for such an anti-slip coating to be accepted by certain industries and institutions, it is absolutely essential that the anti-slip coating be applied to a floor in such a fashion that the overall appearance, especially the shiny, transparent and "wet-look", of the floor is not altered. There have been attempts in the prior art to reduce the slipperiness of a smooth floor by applying natural wax compositions to the floor surface to form a slip-resistant coating. For example, U.S. Pat. No. 2,597,871 issued to Iler and U.S. Pat. No. 3,323,925 issued to Kesslin et al. disclose coating compositions designed to reduce the slipperiness of a floor surface by incorporating additives such as C10–C20 aliphatic formates, feldspar, clay, or colloidal silica into natural wax emulsion polishes. These prior art approaches to the problem of slippery floors are not effective because they only improve slip-resistance under dry conditions. More specifically, the particles in coatings of the prior art are much too small to provide effective slip-resistance when the floor becomes wet or contaminated. Accordingly, the problem of floors becoming slippery when the floor surface becomes wet or contaminated continues to be a problem. In addition, many of the additive particles such as feldspar and clay adversely affect essential characteristics of a floor coating such as transparency, apparent smoothness, shine, and impression of cleanliness by customers.

There is a need for a water-based floor coating composition that when applied to a floor results in a shiny, transparent, slip-resistant, coating. The anti-slip floor coating should have the qualities of being aesthetically pleasing and easy and safe to apply, maintain and remove. Finally, the slip-resistant coating should be effective for a wide variety of shoe-bottom materials and designs, as well as other floor engaging objects that require traction.

SUMMARY AND OBJECTS OF THE PRESENT INVENTION

The present invention is a floor coating composition designed to provide slip-resistance for a floor that is either dry, wet, or contaminated. The floor coating composition when applied and dried comprises a shiny, transparent base layer having particles distributed throughout. The particles are of a relatively large size and range in size from about $5 \times 10^{-4}$ inches to about $2.34 \times 10^{-2}$ inches. The large size of the particles provides for more effective slip-resistance for a coated floor under dry, wet, or contaminated conditions and yet the particles are still small enough that the base floor coating and particles do not detract from the overall appearance and aesthetic qualities which the floor would have with a conventional floor polish.

To apply the floor coating composition, the same is mixed thoroughly and then uniformly spread over a floor surface. This creates a floor coating that includes anti-slip particles uniformly distributed throughout the applied coating. The large size of the particles results in the particles extending generally from the floor surface and above the top surface of the base layer.

Because the particles of the floor coating are sized to extend through the base layer and above the top of the base layer, more effective traction and durability are provided. In particular, the portions of the particles extending above the top of the base layer provide traction for a person walking on the floor surface and for vehicular traffic and walking aids of the disabled.

Accordingly, it is an object of the present invention to provide a shiny, transparent, acrylic-type floor coating which is highly slip-resistant when dry, wet or otherwise contaminated, but yet possesses aesthetic properties which are indistinguishable by pedestrians from those of conventional shiny, transparent floor finishes.

Another object of the present invention is to provide a floor coating that is shiny, transparent and has a sufficiently uniform appearance and slip-resistant throughout.

Another object of the present invention is to provide a floor coating composition that is easy and safe to apply.

Still a further object of the present invention resides in the provision of an anti-slip floor coating composition that when applied to a floor surface yields a floor coating that is easy to clean and maintain and which is also easy to remove.

Another object of the present invention is to provide a slip-resistant coating that is effective to provide adequate traction for high-heel shoes and other shoes with very hard heels.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic, side view of the floor coating of the present invention applied to a floor surface.

DETAILED DESCRIPTION OF THE INVENTION

The present invention entails a slip-resistant floor coating composition that is designed and formulated to be applied to a floor surface. When applied to a floor surface, the slip-resistant floor coating composition of the present invention provide a slip-resistant coating or surface to the floor.

The slip-resistant floor coating composition of the present invention is a water-based, acrylic-type composition and basically comprises a plasticizer portion, a polymer or co-polymer portion (polymer refers to both polymer and co-polymer), a particle portion, and an additive portion. In one preferred embodiment of the floor coating composition of the present invention, the composition comprises by weight 5 to 25% plasticizer portion, 10 to 40% of an acrylic polymer portion, 2 to 8% additives, 0.5 to 20% particles, and the balance water. An example of the floor coating composition of the present invention, in the form of a liquid, is described below in Table 1 below.

TABLE 1

Slip-resistant floor coating composition (liquid)

| | Percent By Weight |
| --- | --- |
| Plasticizer Portion | |
| Tributoxyethyl phosphate | 2.0% |
| Diethylene glycol methyl ether | 4.0% |
| Dibutyl Phthalate | 1.5% |
| Surfactant | .03% |
| Polymer Portion | |
| Acrylic polymer | 22.4% |
| Particle Portion | |
| 40/60 mesh urea-formaldehyde polymer | 3% |
| Additive Portion | |
| Alkali soluble resin | 1.34% |
| Polyethylene | 2.70% |
| Defoamer | .03% |
| Preservative | .06% |
| Water Portion | 57.94% |

Depending on the specific makeup of the floor coating composition, the composition can take the form of a liquid, gel or semi-solid composition. In the embodiment illustrated in Table 1, the floor coating composition assumes a liquid state prior to application.

In the example illustrated in Table 1, the particles themselves are polymeric. It is contemplated that the polymeric particles can be constructed or formed by material from the group consisting of polyester, urea-formaldehyde, melamine, acrylic, poly alkyl diglycol carbonate, and phenolic polymer. While polymeric particles may be preferable, it should be understood that in some cases other types of particles may be appropriate.

The selected particles that are carried in the floor composition can be of various shapes. However, it has been found that a shape generally conforming to a pine cone, pear or the like, provides an especially preferred effective shape for the particles of the floor coating composition.

In a preferred embodiment, the individual particles range in size between $9.8 \times 10^{-3}$ to $1.65 \times 10^{-2}$ inches. In referring to particle size, the larger number of the range just disclosed refers to the smallest standard screen sieve opening through which even the largest particles will pass and the smaller number refers to the largest standard screen sieve opening through which even the smallest particles will not pass. The particle size range is approximately 9.8 to 16.5 mils. This particle size enables the individual particles to be sufficiently anchored on the floor but yet protrude sufficiently above the top surface of a base layer coating so as to be effective to impart traction to the bottom of a shoe or other object engaging the floor. As will be appreciated from subsequent portions of the disclosure, the particle size is to some extent correlated or balanced with the composition as a whole such that when the composition is applied approximately 20 to 80% of each respective particle, on average, will protrude above the upper surface of the base layer.

The particles dispersed throughout the floor coating composition have a Barcol hardness of greater than 50. However, a Barcol hardness greater than about 10 may be adequate in certain applications. The compressive strength of the particles as determined by ASTM D695, is preferably greater than about 25,000 psi. Compressive strengths greater than about 11,000 psi are deemed to be adequate. The particles have a specific gravity of from equal to the specific gravity of the liquid comprising the composition up to 2.50.

As evidenced from Table 1, the base liquid of the floor coating composition includes a significant solids content. In a preferred composition, the solids content would equal approximately 30% by weight of the total weight of the base liquid. However, the solids content by weight could range from approximately 10% to 75%.

It is important to appreciate that the floor coating composition of the present invention is a balanced composition. By being balanced, one is referring to the overall makeup of the composition and particularly the balancing of various component parts of the composition to yield an effective and efficient final floor coating once applied to a floor. In this regard, the composition must have a sufficient solids content such that once applied and after certain volatiles have evaporated, that the remaining base layer or coating is sufficient to anchor the particles on the floor. Thus, there is an important relationship between the solids content of the floor coating composition, the thickness of the dried base layer, and the particle size.

Also, the viscosity of the floor coating composition is important. Here, the composition should be sufficiently viscous to appropriately suspend the particles in the composition and the viscosity of the composition should facilitate uniformly loading the particles on an applicator prior to actual application. Viscosity also plays a role in applying the floor coating composition to a floor surface. Here, it is important that the viscosity of the composition be such that the composition not excessively flow when being applied but permits an individual applying the composition to control the final thickness of the resulting floor coating. To accomplish the above, the viscosity of the floor coating composition of the present invention falls within a preferred range of 10 to 15 centipoise. However, it is appreciated that in some applications the viscosity might exceed 15 centipoise and in some applications the viscosity may be between 5 and 10 centipoise.

The amount of particles contained in the floor coating composition is sufficient to yield approximately 30 to 150 particles per square inch of floor surface when applied. As will be appreciated from subsequent portions of this disclosure, it is important that the composition be sufficiently mixed prior to application such that the included particles are generally uniformly distributed throughout the liquid so as to yield a generally uniform application rate and a surface coverage of approximately 30 to 150 particles per square inch. More particularly, it is contemplated that in a most preferred application there would be approximately 60 to 90 particles per square inch. The next most preferred application would be 50 to 100 particles per square inch.

Now, turning to applying the floor coating composition to a floor, it is first noted that the composition can be applied by rolling, mopping, pouring, spraying or wiping the floor composition onto and over a floor surface. A preferred method of applying the floor coating composition is via a paint roller, particularly a paint roller having a ⅜ inch nap. To apply the floor coating composition of the present invention with a paint roller, the composition is poured or transferred into a container. Prior to transferring to the container in the case where the floor coating composition is in a liquid form, the composition is shaken and mixed and thereafter immediately poured into a container such as a paint roller tray. Shaking the floor coating composition serves to uniformly distribute the particles throughout the composition. The paint roller is then rolled back and forth in the tray to evenly coat the roller with the total mixed composition including the carried or suspended particles. In the case of a liquid composition, it is important that the composition have a sufficiently high viscosity that will provide for the even distribution of the liquid and particles over the roller. As pointed out above, the individual particles should have a specific gravity falling within a range to ensure that the particles are evenly distributed within the floor coating composition covering the roller. In particular, the specific gravity of the particles should, in a preferred embodiment, range from a specific gravity equal to the specific gravity of the liquid comprising the floor coating composition to a specific gravity of 2.5.

Using the roller, the floor coating composition of the present invention is evenly rolled onto a section or area of a floor surface. The floor coating composition should preferably initially be rolled in the center of a floor surface section being treated. During the process, the roller is repeatedly inserted into the tray as required to adequately coat the particular floor section being acted upon. The floor surface section initially rolled should preferably be approximately 4 feet by 4 feet. Once the initial floor surface section has been coated, additional floor surface section can be coated in like manner until the entire floor surface has been coated.

After application, the floor composition is allowed to dry to touch resulting in the applied composition forming a hardened and slip resistant coating over the floor.

The time required for the floor coating composition to dry is approximately 30 to 60 minutes. It should be noted that the floor coating composition of the present invention can be applied in successive coats. Thus, after a first coat of the composition has dried, then a second coat can be applied in similar manner.

FIG. 1 shows a vertical cross-section of a floor 10 having the floor coating composition of the present invention applied thereto. Disposed over the floor 10 is a coating layer 12 formed by the composition of the present invention. The coating layer 12 is made up of a base layer 12a and the particles 12b which are anchored within the base layer 12a and which protrude out and above the top surface of the base layer 12a. As seen in FIG. 1, the individual particles 12b are securely anchored in the base layer 12a. In fact, a substantial number of particles 12b actually engage the floor surface 10 or surface of the previous hardened coat. It is contemplated that the ratio of the particle size to base layer thickness can range between 10.1 to 1.0 and 1.01 to 1.00. It is contemplated that a preferred ratio between the particle size and base layer thickness would be between 5 to 1 and 1.25 to 1. It is appreciated that the ratio of the particle size to base layer thickness can be selectively adjusted by varying the viscosity and non-volatile solids content of the floor coating composition.

The importance of achieving a coating layer 12 wherein the particles 12b are securely anchored within the base layer 12a but yet project sufficiently above the top surface of the base layer to be effective cannot be over-emphasized. To a substantial extent this is realized by creating the "balanced" composition. In the context of the present invention, the "balanced" composition is achieved by balancing the solids content (i.e. the non-volatile, non-particle constituents of the floor coating composition) with the size of the particles 12b. As noted before, in many if not most cases, the particles will extend substantially, if not totally, through the base layer 12a and will in fact engage and be supported by the floor surface 10 or by previously applied hardened coats of coating layer 12. Also, it is important that a substantial portion of the individual particles 12b extend out and above the top of the base layer 12a. It is preferred that approximately 1/5 to 4/5 of the total particle structure may extend above the top surface of the base layer 12a. To achieve this range of exposure or projection above the top surface of the base layer 12a, it is contemplated that the solids content of the base liquid (non-particles portion of the composition of the floor coating composition would be approximately 28 to 32% (assuming a range of particle size of $9.8 \times 10^{-3}$ to $1.65 \times 10^{-2}$ inches). However, it is contemplated that the amount of solids contained with the floor coating composition could range from 10 to 75% by weight.

It is appreciated that after application, portions of the floor coating composition will evaporate due to the volatility of such constituents. Below in Table 2 is an example description of the general make up of the applied and dried floor coating composition as it exists on a floor surface.

TABLE 2

| FLOOR COATING COMPOSITION (In Dried and Applied State) | |
|---|---|
| | Weight % |
| Tributoxyethyl phosphate | 6.10% |
| Dibutyl phthalate | 4.60% |
| Surfactant | 0.09% |

TABLE 2-continued

FLOOR COATING COMPOSITION
(In Dried and Applied State)

| | Weight % |
|---|---|
| Acrylic polymer | 67.20% |
| Alkali soluble resin | 4.00% |
| Polyethylene | 8.44% |
| Defoamer | 0.39% |
| Preservative | 0.18% |
| 40/60 mesh urea-formaldehyde polymer | 9.00% |

The floor coating composition of the present invention is used to provide a slip-resistant coating layer 12 over a slippery floor surface. As measured with a Brungraber Mark II slip tester and all suitable shoe-bottom materials, the resulting coating layer 12 of the present invention provides a slip-resistance of at least 0.25. The slip-resistant benefit is provided due to the large size of the particles 12b that project from the base layer 12a and by the number of particles per square inch. The large size of particles 12b ensures that a sufficient portion of each particle protrudes above the top surface of the base layer 12a so as to provide effective traction. The composition is so balanced and so formulated that a sufficient portion of each particle extends through the base layer 12a so as to sufficiently anchor the particles in such a manner that high stability and durability are achieved.

One very important advantage of the floor coating composition of the present invention is that the same is designed and formulated such that it does not alter the shiny, clean and wet-look appearance that is found on existing floors such as in department stores, grocery stores, etc. It is important that this shiny, clean, wet-look floor appearance be maintained after the application of the floor coating composition of the present invention. Consequently, once applied, the base layer 12a is in fact transparent such that the original appearance of the floor is unaltered. Also, the fact that the floor coating composition is water-based provides for easy and safe application and also enables the floor coating composition to be easily removed. The durability of the floor coating composition allows the coated floor to be regularly cleaned and mopped with a floor detergent. In particular, the applied floor coating can be buffed with a high speed buffer and burnished to clean and renew the shine of the applied floor coating without dislodging or diminishing the effectiveness of the anti-slip particles. Again, this is an extremely important characteristic of the floor coating composition because it is paramount that a slip-resistant coating not detract in any way from the shiny, clean and "wet-look" appearance or the maintenance program of a conventional commercial floor of the type found for example in a retail store.

It should be appreciated that the floor coating composition of the present invention is adapted to be used in many different environments and on various types of floors. While the floor coating composition of the present invention has been described at certain times as being useful in providing traction between the floor and the bottom of a shoe, it will be appreciated that the floor coating composition will provide traction between a floor and many other objects such as the tip of a crutch, tires on vehicles, etc.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A water-based acrylic slip-resistant floor coating composition comprising: water, a plasticizer portion, a polymer portion, an additive portion and particles that range in size from $5 \times 10^{-4}$ to $2.34 \times 10^{-2}$ inches, and wherein the composition includes a base liquid solids content balanced with the size of the particles such that once the composition has been applied to a floor to form a shiny transparent floor coating having a base layer the particles will be firmly anchored into the base layer and a substantial portion of respective particles will project upwardly from the base layer and assume an exposed position above the base layer.

2. The floor coating composition of claim 1 wherein the base liquid solids content of the composition ranges from 10 to 75% by weight.

3. The floor coating composition of claim 2 wherein the plasticizer portion comprises 5 to 25% by weight of the composition, the polymer portion comprises 10 to 40% of the composition, the additives portion comprises 2 to 8% of weight of the composition, the particles portion comprises 0.5 to 20% by weight of the composition, and the water comprises the balance of the total composition.

4. The floor coating composition of claim 2 wherein the specific gravity of the particles ranges from a specific gravity equal to the specific gravity of the liquid that forms a part of the composition to a specific gravity of 2.50.

5. The floor coating composition of claim 2 wherein the particles have a Barcol hardness of at least 10.

6. The floor coating composition of claim 5 wherein the particles have a compressive strength greater than 11,000 psi.

7. The floor coating composition of claim 1 wherein the particles are polymeric.

8. The floor coating composition of claim 7 wherein the polymeric particles are formed from urea-formaldehyde.

9. The floor coating composition of claim 7 wherein the polymeric particles are formed from the group consisting of polyester, urea-formaldehyde, melamine, acrylic, poly alkyl diglycol carbonate and phenolic.

10. The floor coating composition of claim 1 wherein the particles range in size from $9.8 \times 10^{-3}$ to $1.65 \times 10^{-2}$ inches.

11. The floor coating composition of claim 1 wherein the polymer portion of the base liquid composition includes an acrylic polymer.

12. The floor coating composition of claim 2 wherein the base liquid composition in an applied and dried state yields a floor coating having a transparent base layer.

13. The floor coating composition of claim 2 wherein the solids content of the composition ranges from 28 to 32% by weight.

14. The floor coating composition of claim 4 wherein the specific gravity of the particles is approximately 1.1 to 1.6.

15. The water-based floor coating composition of claim 1 wherein the viscosity of the composition is approximately 10 to 15 centipoise.

16. A method of forming a shiny, transparent, slip-resistant acrylic-type coating on a floor comprising the steps of:
   a) mixing a floor coating composition having particles that range in size from $5 \times 10^{-4}$ to $2.34 \times 10^{-2}$ inches;
   b) applying the mixed floor coating composition to an applicator;
   c) moving the applicator over a floor surface and applying the mixed floor coating composition to the floor surface; and
   d) wherein the step of applying the mixed floor coating composition includes applying a base layer to the floor surface where the thickness of the base layer is set relative to the size of the particles such that on average 1/5 to 4/5 of each respective particle that forms a part of the floor coating composition extends above the dried base layer.

17. The method of claim 16 wherein the applicator comprises a paint roller and wherein the step of applying the floor coating composition to the floor includes the step of rolling the paint roller back and forth in the floor coating composition so as to evenly coat the roller and thereafter rolling the roller over the floor surface and coating the floor with the floor coating composition.

18. The method of claim 16 including the step of coating the floor surface with the composition such that the particles embedded in the base layer are present at approximately 30–150 per square inch.

19. The method of claim 16 wherein the step of applying the floor coating composition to a floor surface includes embedding the respective particles within the base layer such that a portion of a substantial number of particles actually engage the surface being coated and extend upwardly through the base layer.

20. The method of claim 19 wherein the particles have a Barcol hardness of at least 10 and a compressive strength greater than 11,000 psi.

21. The method of claim 16 wherein the floor coating composition includes a liquid portion and wherein the specific gravity of the particles ranges from a specific gravity equal to the liquid portion of the composition up to a specific gravity of 2.5.

22. The method of claim 16 wherein the particles that form a part of the floor coating composition are polymeric particles.

23. The method of claim 22 wherein the polymeric particles are selected from the group consisting of polyester, urea-formaldehyde, melamine, acrylic, poly alkyl diglycol carbonate and phenolic polymer.

24. The method of claim 16 wherein the particles of the floor coating composition range in size from $9.8 \times 10^{-3}$ to $1.65 \times 10^{-2}$ inches.

25. The method of claim 16 wherein the viscosity of the liquid portion of the floor coating composition is approximately 10 to 15 centipoise.

26. The method of claim 16 wherein the base liquid portion of the floor coating composition includes a solids content of 10 to 75% by weight.

27. The method of claim 26 wherein the solids content of the base liquid composition is approximately 28 to 32%.

28. The method of claim 21 wherein the specific gravity of the particles is approximately 1.1 to 1.6.

29. The method of claim 18 wherein the particles of the floor coating composition are polymeric.

30. The method of claim 29 wherein the polymeric particles are formed from urea-formaldehyde.

31. The method of claim 29 wherein the polymeric particles are formed from the group consisting of polyester, urea-formaldehyde, melamine, acrylic, poly alkyl diglycol carbonate and phenolic.

* * * * *